US012609451B2

(12) United States Patent
Lewis

(10) Patent No.: US 12,609,451 B2
(45) Date of Patent: Apr. 21, 2026

(54) DUAL BAND SHARED APERTURE ANTENNA

(71) Applicant: Wiliot, Ltd., Caesarea (IL)

(72) Inventor: Aviv Lewis, Haifa (IL)

(73) Assignee: Wiliot, Ltd., Caesarea (IL)

( * ) Notice: Subject to any disclaimer, the term of this patent is extended or adjusted under 35 U.S.C. 154(b) by 166 days.

(21) Appl. No.: 18/524,524

(22) Filed: Nov. 30, 2023

(65) Prior Publication Data

US 2025/0183541 A1 Jun. 5, 2025

(51) Int. Cl.
*H01Q 9/04* (2006.01)
*H01Q 1/38* (2006.01)

(52) U.S. Cl.
CPC ............... *H01Q 9/045* (2013.01); *H01Q 1/38* (2013.01)

(58) Field of Classification Search
CPC ........ H01Q 9/045; H01Q 1/38; H01Q 1/2291; H01Q 13/18
See application file for complete search history.

(56) References Cited

U.S. PATENT DOCUMENTS

2018/0076508 A1* 3/2018 Minard .................. H01Q 5/378
2019/0252798 A1* 8/2019 Jain ........................ H01Q 13/20
2020/0076086 A1* 3/2020 Cheng ...................... H01Q 9/42
2023/0039854 A1* 2/2023 Cao ...................... H01Q 13/103

OTHER PUBLICATIONS

Ding et al. ("A Dual-Band Shared-Aperture Antenna for Microwave and Millimeter-Wave Applications in 5G Wireless Communication," in IEEE Transactions on Antennas and Propagation, vol. 70, No. 12, pp. 12299-12304, Dec. 2022, doi: 10.1109/TAP.2022.3209220.) (Year: 2022).*

Song Shi, Kazuhiro Hirasawa, and Zhi Ning Chen, "Circularly Polarized Rectangularly Bent Slot Antennas Backed by a Rectangular Cavity." IEEE Transactions on Antennas and Propagation, vol. 49, No. 11, Nov. 2001.

* cited by examiner

*Primary Examiner* — Seung H Lee
(74) *Attorney, Agent, or Firm* — M&B IP Analysts, LLC

(57) ABSTRACT

According to a first aspect of the present disclosed subject matter, a dual-band shared aperture antenna (2BSA Antenna) comprising: a patch-antenna disposed on a front side of a printed circuit board (PCB); a slot-antenna disposed on a rear side of the PCB; and a metal cavity connected to the rear side of the PCB, wherein the metal cavity is electromagnetically coupled with the slot antenna.

14 Claims, 4 Drawing Sheets

DUAL BAND SHARED APERTURE ANTENNA

TECHNICAL FIELD

The present disclosed subject matter relates to antennas. More particularly, the present disclosed subject matter relates to dual-band shared aperture antennas for energizing and communicating with passive IoT devices.

BACKGROUND

A dual-band shared aperture antenna operates at two different frequency bands within the same aperture, serving applications such as satellite communication, radar, and remote sensing. Dual-band antennas can transmit and receive RF signals individually or simultaneously. Various geometric configurations are used in designing aperture antennas, including slot antennas, horn antennas, and Cassegrain antennas. Shared aperture antennas integrate multiple functions into a single aperture using wideband multiple-beam technology, with radar, space communications, and electronic warfare applications.

Implementing such antennas can be cost-prohibitive due to the need to address mutual interference between antennas and their non-compact dimensions, which may not be suitable for commercial applications. Additionally, devices potentially utilizing dual-band shared aperture antennas in commercial applications are often wall-mounted, and the proximity of a wall to the antennas may degrade antenna performance.

It would therefore be the objective of the present disclosure to provide a solution that overcomes the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure.

According to a first aspect of the present disclosed subject matter, a dual-band shared aperture antenna (2BSA Antenna) comprising: a patch-antenna disposed on a front side of a printed circuit board (PCB); a slot-antenna disposed on a rear side of the PCB; and a metal cavity connected to the rear side of the PCB, wherein the metal cavity is electromagnetically coupled with the slot antenna.

In some exemplary embodiments, the front side and the rear side of the BCB are opposite to one another.

In some exemplary embodiments, the patch-antenna is a duplex antenna for frequencies in the vicinity of 2.48 GHz.

In some exemplary embodiments, the patch-antenna is dual linearly polarized antenna adapted to operate either as a horizontal antenna or as a vertical antenna.

In some exemplary embodiments, the patch-antenna further comprises a bandwidth enhancement matching network.

In some exemplary embodiments, the slot-antenna is a broadcasting antenna for frequencies in the vicinity of 915 MHZ.

In some exemplary embodiments, the metal cavity geometrically overlaps the rear side of the PCB.

In some exemplary embodiments, the metal cavity facilitates shaping the antenna’s radiation pattern direction, and providing shielding from disturbances behind the antenna.

In some exemplary embodiments, the slot-antenna is a circular polarization antenna.

In some exemplary embodiments, the slot antenna comprises a meandered slot to increase the slots length and, consequently, reduce the overall antenna size.

In some exemplary embodiments, the circular polarization is derived by: augmenting the slot antenna with the metal cavity; the meandered slot; and a short-line connection.

In some exemplary embodiments, the 2BSA antenna further comprises at least hedge configured to eliminate mutual interference between the patch antenna from the slot antenna.

In some exemplary embodiments, the at least hedge is comprised of a plurality of closely grounded spaced vias.

In some exemplary embodiments, the short-line is hedged by ground potential, for shielding power input lines entering.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

In the drawings.

DETAILED DESCRIPTION

Figure 1:
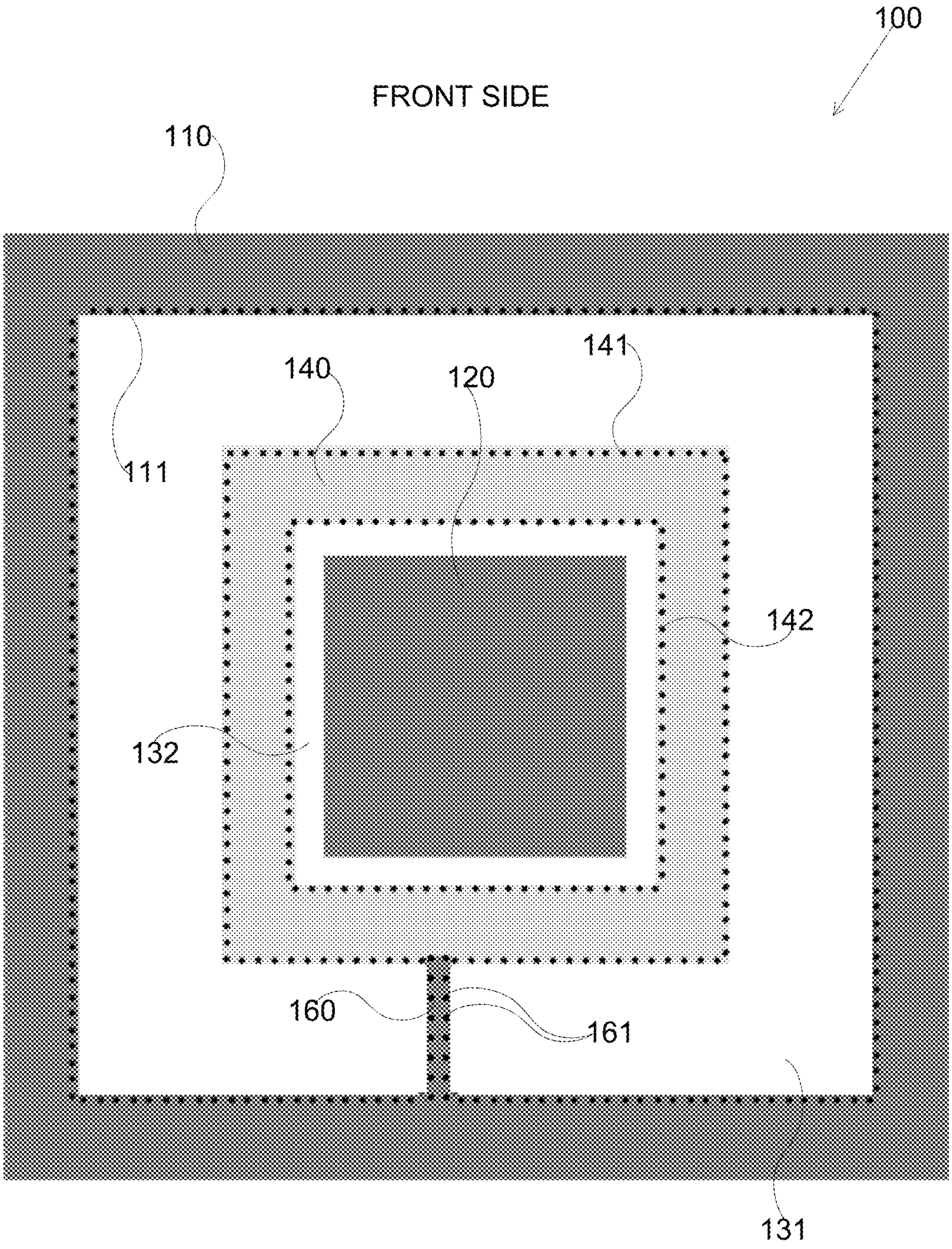
FIG. 1 illustrates a layout of a front side of the dual-band shared aperture antenna (FDB), in accordance with some exemplary embodiments of the disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

One objective of the disclosed embodiments is to provide a wireless network element (WNE) capable of activating dual frequency bands for energizing IoT passive tags and echoing signals broadcasted by the IoT tags. Such WNE should be implemented using two antennas operating at different frequency bands. In some exemplary embodiments, circular and/or dual linear polarization antennas are required to ensure a proper communication link with IoT tags, which typically have linear polarization and random orientation.

One technical problem dealt with by the disclosed subject matter is that an antenna assembly implementation using two separate antennas may lead to mutual interference between the antennas and a non-compact design.

Another technical problem dealt with by the disclosed subject matter is achieving circular polarization and/or dual linear polarization is challenging since commercially available hybrid feeding network technology results in increased power loss, complexity, cost, and high real estate demands.

Yet another technical problem dealt with by the disclosed subject matter is that WNEs are often installed on walls, and the proximity of a wall to the WNE antennas can degrade the antenna's performance or even cause the WNE to malfunction. Commercially available techniques, such as wideband antennas resilient to environmental frequency shifts, cannot achieve the objectives of the present disclosure due to their size and cost.

It should therefore be noted that a hybrid feeding network for circular polarization and the need for shielding lead to solutions with multiple PCBs, inevitably resulting in a complex and expensive assembly process.

One technical solution involves implementing a Dual-Band Shared Aperture Antenna assembly (2BSA Antenna) that efficiently combines two antennas operating at different frequencies within a single PCB. In some exemplary embodiments, the PCB includes a high-frequency (2.4 GHZ) patch antenna encircled by a low-frequency (915 MHZ) ring slot antenna, along with electronic circuitry associated with the WNE's operation.

The patch antenna may be embedded on a front side of the PCB, while the slot antenna may be embedded on a rear side of the PCB, with the ground (GND) layer as an inner copper layer within the PCB. In some exemplary embodiments, both the front and rear sides of the PCB may feature external copper layers. The geometric patterns of both the patch antenna and slot antenna can be achieved through subtractive printing (etching) on the copper layers. Additionally, or alternatively, both sides of the PCB may be dielectric substrates, and the geometric patterns of the patch antenna and slot antenna may be realized by additive printing of conductive material on the substrates. For the sake of simplifying the description, the term 'embedding' may be loosely used to describe any of the above methods for shaping antenna patterns.

In some exemplary embodiments, the patch antenna can be a dual linearly polarized that can be controlled to switch between horizontal and vertical polarization.

In some exemplary embodiments, a slot antenna may be augmented by a metal cavity forming electromagnetic coupling that facilitates the slot's antenna circular polarization.

Furthermore, the slot may be meandered to increase the slot length and, consequently, reduce the overall antenna size. In some embodiments, circular polarization is achieved in the antenna structure through a short-line connection, a rectangular cavity, and the meandered slot, thereby eliminating the need for a hybrid feeding network.

An example design for slot antenna's circular polarization is based on the design of 'Circularly Polarized Rectangular Antennas Backed by a Rectangular Cavity' by Song Shi, et al., published in IEEE.

Another technical solution involves adding a metal cavity backing to the rear side of the PCB, shaping the antenna's radiation pattern direction, and providing shielding from disturbances behind the antenna, such as a wall.

Yet another technical solution involves isolating the patch antenna from the slot antenna so that the slot antenna acts as a ground (GND) layer for the patch antenna. Thereby eliminating mutual interference between the antennas and between the antennas and electronic components of the WNE. In some exemplary embodiments, a series of hedges, each including a plurality of closely spaced vias (to be described in detail further below), create this isolation.

FIG. 1 illustrates a layout of the front side of a dual-band shared aperture antenna (FDB) 100. FDB 100 may be realized on a printed circuit board (PCB) incorporating copper laminated layers in a dielectric substrate (poly) typically made of fiberglass with epoxy. In some exemplary embodiments, the PCB includes four layers: a front side layer for FDB 100, two sandwiched layers, one for GND and the other for electronic components interconnections, and a rear side layer for RDB 200, (to be described in detail further below).

FDB 100 may be composed of enclosing frames, a GND frame 110, a Poly-Frame 131, solder-masked ground frame (Mask-Frame) 140, a Poly-Frame 132, and Patch-Antenna 120. In some exemplary embodiments, Poly frame 131 separates GND-Frame 110 from Mask-Frame 140, and a Poly-Frame 132 separates Patch-Antenna 120 from Mask-Frame 140.

In some exemplary embodiments, GND-Frame 110 is a copper laminated layer used to incircle Patch-Antenna 120 to facilitate its aperture and prevent external interference.

In some exemplary embodiments, Patch-Antenna 120 is a duplex-antenna designed to transmit and receive signals in the vicinity of the 2.45 GHz frequency. Patch-Antenna 120 may be a dual linearly polarized antenna adapted to operate either as a horizontal antenna or as a vertical antenna and can be automatically controlled to switch between horizontal and vertical polarization.

In some exemplary embodiments, Patch-Antenna 120 may be supported by a bandwidth enhancement matching network, which includes a transmission line section and a shunt capacitor (not shown). Additionally, or alternatively, a plurality of multiple capacitor pads may be added to allow for positional tuning. It should be noted that the bandwidth enhancement matching network replaces a commercially available non-tunable stub matching network.

It should be noted that experimental testing of Patch-Antenna 120 exhibits realized gain of 3 dbi at beam width of=80 deg and back-lobe level of −18 db.

In some exemplary embodiments, FDB 100 may further include a First-Hedge 111, a Second-Hedge 141, and a Third-Hedge 142. Each hedge may be realized by a plurality of closely spaced vias, that form together a ground wall. It should be noted that a via is a small coated hole that connects two or more GND layers for facilitating inter-layer GND connections. All hedges (111, 141, 142) may be viewed as a grounded wall that partition (isolate) one or more frames from one another.

In some exemplary embodiments, First-Hedge 111 may be used to maintain ground continuity throughout FDB 100. The Second-Hedge 141 may be used to prevent leakage of RF signals between a slot antenna (to be described in detail further below) and the electronic circuitry disposed on the PCB. The Third-Hedge 142 may be used as an RF shield, isolating Patch-Antenna 120 from a slot antenna (to be described in detail further below), so that Patch-Antenna 120 senses the slot antenna as a ground (GND) layer, thereby eliminating mutual interference between the antennas.

It should be noted that the hedges described above are not necessarily limited to the dichotomous definition provided; in fact, their combination mutually enhances the intended effect of each hedge.

In some exemplary embodiments, Short-line 160 may be used to connect between GND frame 110 and Mask-frame 140, both having ground potential. Short-line 160 may include Short-line hedges 161 that connect Short-line 160 to all ground layers of the PCB. In some exemplary embodiments, Short-line 160 and its Short-line hedges 161 are utilized as shielding channel for power input lines entering the PCB, through internal layers for powering the WNE (to be described in detail further below).

Figure 2:
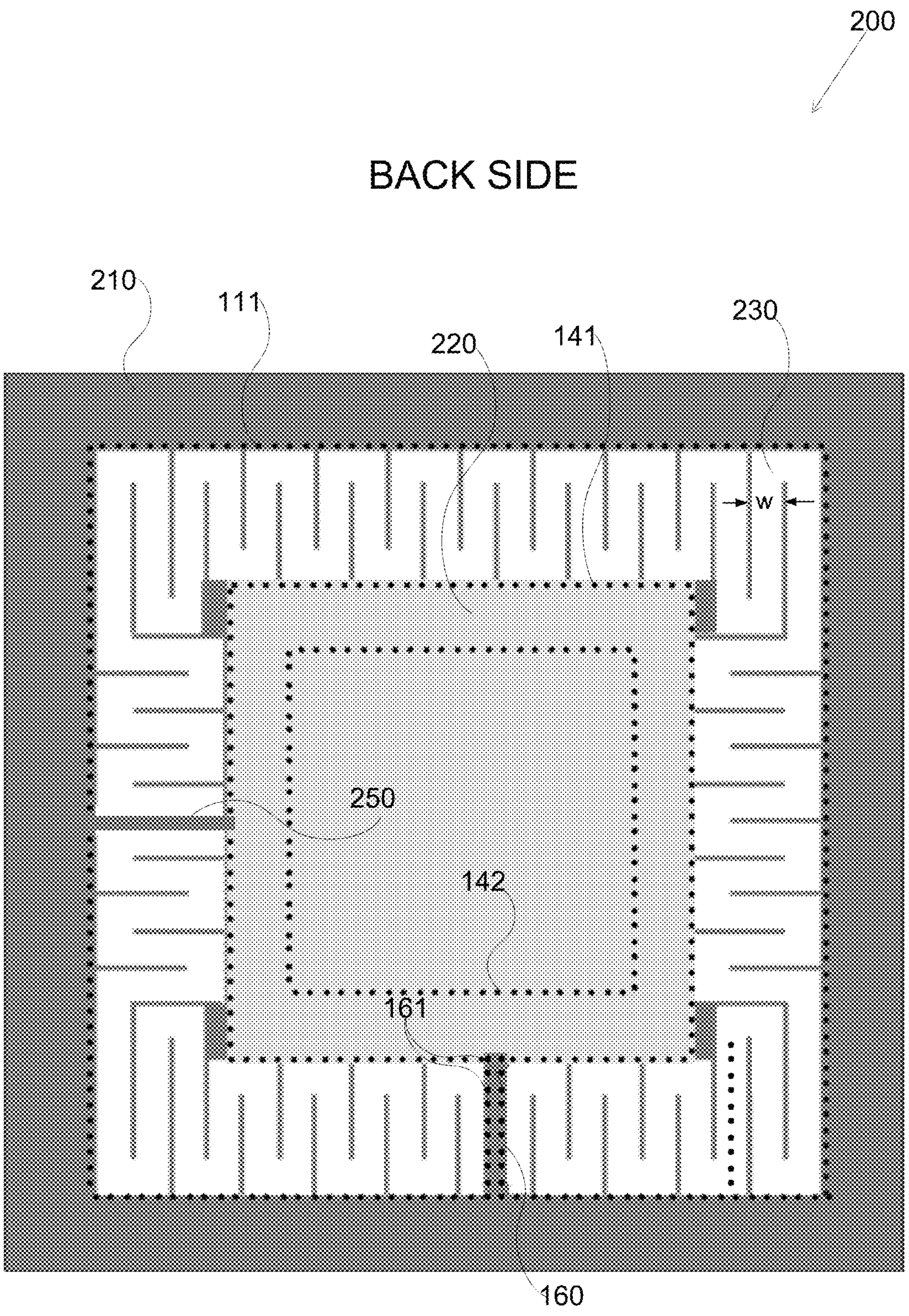
FIG. 2 illustrates a layout of a rear side of the dual-band shared aperture antenna (RDB), in accordance with some exemplary embodiments of the disclosed embodiments.

FIG. 2 illustrates a layout of a rear side of the dual-band shared aperture antenna (RDB) 200. In some exemplary embodiments, RDB 200 may be realized on a printed circuit board (PCB) incorporating copper laminated layers in a dielectric substrate (poly) typically made of fiberglass with epoxy. In some exemplary embodiments, the PCB includes four layers: a front side layer for FDB 100 (of FIG. 1), two sandwiched layers one for GND and the other for electronic components interconnections, and a rear side layer for RDB 200. RDB 200 may include a GND frame 210, a solder-masked ground frame (Mask-Frame) 220, and a Meandered slot (Slot) 230. The Mask-Frame 220 and GND frame 210 form together a conductive ground plane in which a non-conductive Slot 230 passes.

It should be noted that width [w] of Slot 230 is significantly smaller compared to the wavelength of the center frequency, i.e., 915 MHz.

RDB 200 further incorporates a metal cavity backing (to be described in detail below), thereby forming together a Slot-Antenna (to be described in further detail below). In some exemplary embodiments, the metal cavity empowers shaping the radiation pattern direction and shields the antenna from disturbances behind it (e.g., a wall).

It should be noted that RDB 200 and the metal cavity's physical dimensions are smaller than the wavelength at the lowest frequency of operation (915 MHZ). In some exemplary embodiments, circular polarization is achieved within RDB 200 through a combination of Short-line 160, the metal cavity, and Slot 230, eliminating the need for a hybrid feeding network.

In some exemplary embodiments, a compact metallic cavity assembly measures 10 centimeters (cm) in width, 10 cm in length, and has a thickness of 2 cm.

It should be noted that experimental 915 MHz Radiation Pattern testing of the Slot-Antenna, i.e., RDB 200 coupled with a metal cavity, exhibits a realized gain of 4 dBi at a beam width of 100 degrees, axial ratio of 3 dB, and a back-lobe level of −9 dB.

In some exemplary embodiments, RDB 200 may further include a First-Hedge 111, a Second-Hedge 141, and a Third-Hedge 142. Each hedge may be realized by a plurality of closely spaced vias that together form a grounded wall. A via is a small coated hole that connects two or more GND layers to facilitate inter-layer GND connections. All these hedges can be viewed as grounded walls that partition (isolate) one or more frames from one another. It should be noted that hedges 111, 141, and 142 of RDB 200 are respectively connected with hedges 111, 141, and 142 of FDB 100.

In some exemplary embodiments, First-Hedge 111 may be used to maintain ground continuity throughout RDB 200, Second-Hedge 141 may be used to prevent leakage of RF signals between the Slot-Antenna and the electronic circuitry disposed on the PCB; the 3rd hedge 142 may be used as an RF shield, isolating Patch-Antenna 120 from the RDB 200 so that Patch-Antenna 120 senses the RDB 200 as a ground layer, thereby eliminating mutual interference between the antennas.

It should be noted that the hedges described above are not necessarily limited to the dichotomous definition provided; in fact, their combination mutually enhances the intended effect of each hedge.

In some exemplary embodiments, Short-line 160 may be used to connect between GND frame 210 and Mask-frame 220, both having ground potential. Short-line 160 may include Short-line hedges 161 that connect Short-line 160 to all ground layers of the PCB. In some exemplary embodiments, Short-line 160 and its Short-line hedges 161 are utilized as a shielding channel for power input lines entering the PCB, through internal layers for powering the WNE (to be described in detail further below)

In some exemplary embodiments, RDB 200 may further include a transmission line (Tx) Line 250. Tx-Line 250 may be used by WNE (to be described in detail below) to feed RF energizing signals to the RDB 200 for broadcast at a frequency of 915 MHz. It should be noted that Tx-Line 250 may be coupled with a matching network including a transmission line section and a serial capacitor (not shown).

Figure 3:
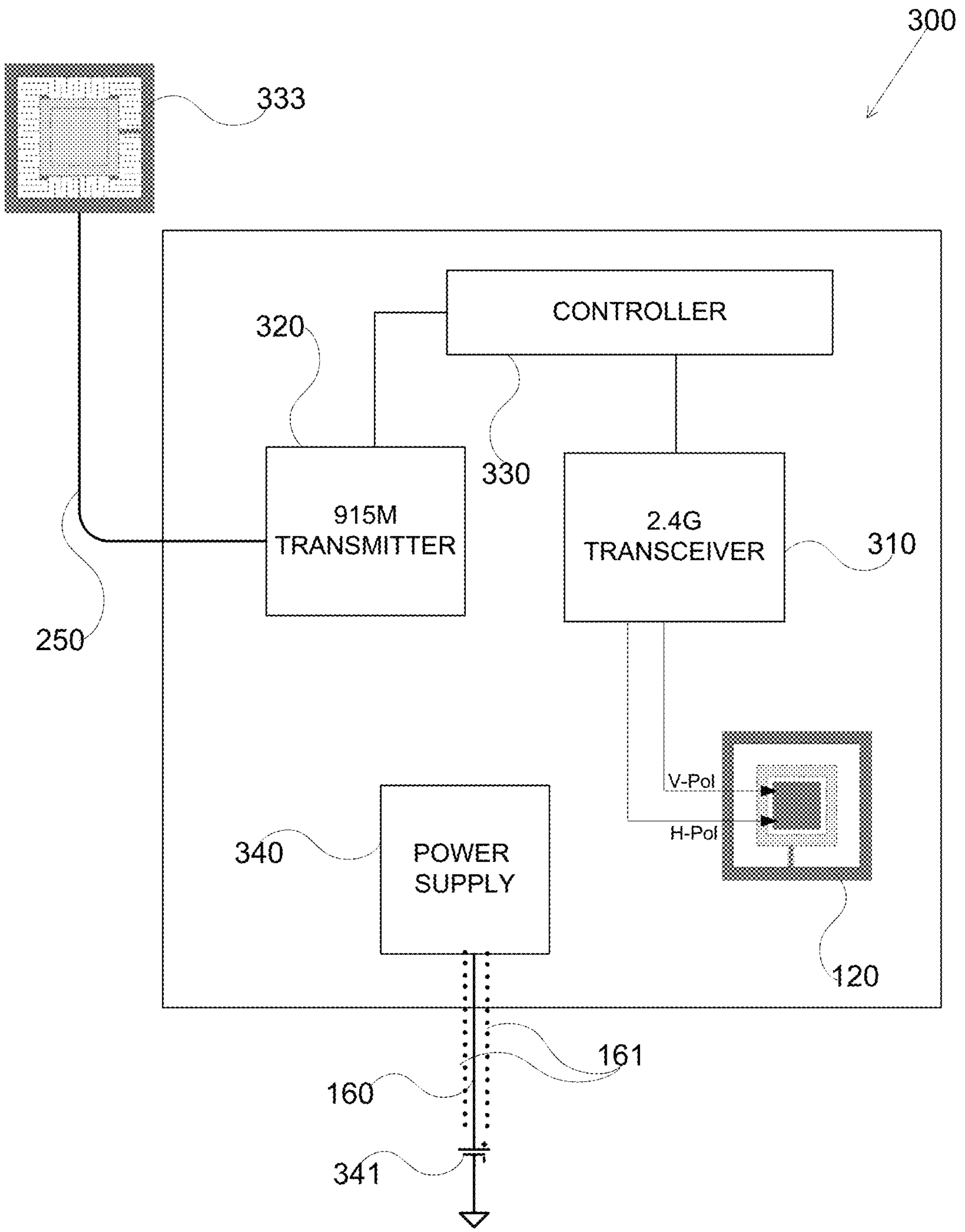
FIG. 3 shows a functional block diagram of a wireless network element (WNE), in some exemplary embodiments of the disclosed embodiment.

FIG. 3 shows a functional block diagram of a wireless network element (WNE) 300. WNE 300 may be a wireless network element capable of activating dual frequency bands for energizing IoT passive tags, transmitting information to IoT tags, and receiving signals broadcasted by the IoT tags.

In some exemplary embodiments, WNE 300 may include components associated with its operation. These components can include (but are not limited to) a Transceiver (TxRx) 310, a Transmitter (Tx) 320, a Controller 330, and a Power Supply (PS) 340, which may be located within (but not limited to) Mask-Frame 220, as shown in FIG. 2. It should be noted that some components may also be located on Mask-Frame 140, as shown in FIG. 1.

In some exemplary embodiments, TxRx 310 can be a transceiver designed to transmit and receive signals in the vicinity of the 2.45 GHz frequency with Patch-Antenna 120. Additionally, or alternatively, TxRx 310 may be configured to control the polarization of Patch-Antenna 120 so it can operate as either a horizontal antenna (H-Pol) or a vertical antenna (V-Pol)

In some exemplary embodiments, Tx 320 can be a transmitter designed to broadcast energizing signals to IoT tags in the vicinity of a 915 MHz frequency using Slot-Antenna 333. It should be appreciated that Slot-Antenna 333 may be comprised of RDB 200 and a metal cavity backing (to be described in detail below). Tx 320 may be connected to Antenna 333 via a Tx Line 250, which is used by WNE 300 to feed energizing signals to RDB 200 at a frequency of 915 MHz. It should be further noted that Tx-Line 250 may be coupled with a matching network, including a transmission line section and a serial capacitor (not shown).

In some exemplary embodiments, PS 340 is designed to generate various DC voltages required by WNE 300 for operating all its components. PS 340 can be powered by an external power supply or a battery 341 through traces passing within a shielding channel created by Short-line 160 and Short-line hedges 161.

In some exemplary embodiments, Controller 330 includes a number of execution functions realized as analog circuits, digital circuits, or both. Controller 330 incorporates memory (not shown) configured to retain data and program instructions to independently carry out processes. In some exemplary embodiments, Controller 330 can perform functions such as memory read/write, interface with input-output components, and execute logic operations.

In some exemplary embodiments, Controller 330 enables WNE 300 to operate as a network element capable of connecting to the Internet, either wirelessly or by physical Ethernet connection. Additionally, or alternatively, Controller 330's program application causes WNE 300 to operate as a gateway, a bridge, or a router with both LAN and WAN capabilities. Controller 330 may be configured to generate and prepare data packets for transmission, perform cyclic redundancy checks (CRC) code generation, packet whitening, packet encryption/decryption, and authentication, convert data from parallel to serial, and stage the packet bits for transmission in the analog transmitter path.

In some exemplary embodiments, Controller 330 utilizes TxRx 310 for communicating with a plurality of IoT tags at a base frequency of 2.45 GHz using low-power communication protocols, such as Bluetooth Low Energy (BLE) communication protocol. Additionally, or alternatively, Controller 330 utilizes Tx 320 for broadcasting energizing RF signals to a plurality of IoT tags at a base frequency of 915 MHz.

Figure 4:
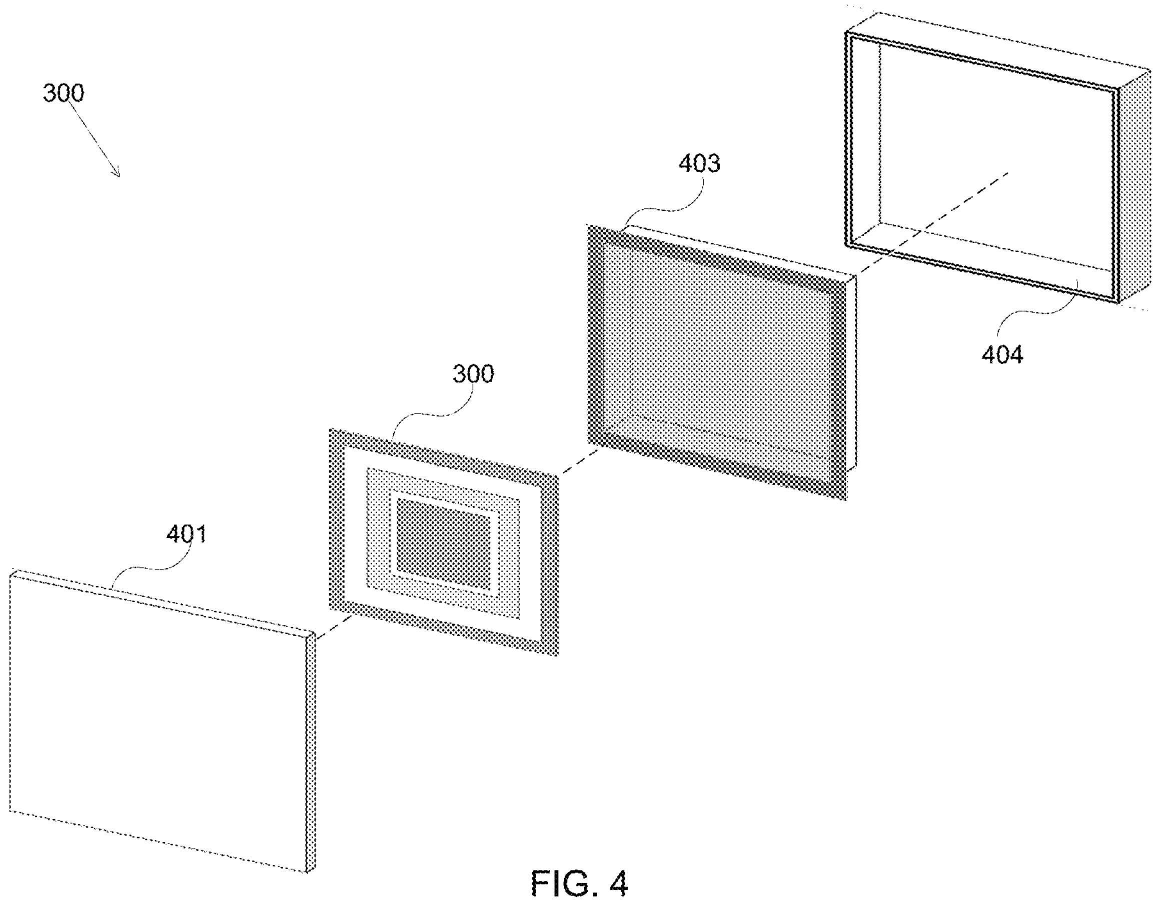
FIG. 4 illustrates an exploded view of WNE assembly, in accordance with some exemplary embodiments of the disclosed embodiments.

FIG. 4 illustrates an exploded view of a WNE Assembly 400 utilizing a dual-band shared aperture antenna. Assembly 400 may include a Front-Cover 401, a WNE 300 incorporating the dual-band shared aperture antenna, a metal-plated cavity (Metal-Cavity) 403, and a Rear-Cover 404.

In some exemplary embodiments, Front-Cover 401 and Rear-Cover 404 may be made of dielectric materials, such as plastic, PVC, rigid polymer materials, or a combination thereof. Front-Cover 401 and Rear-Cover 404 are used as enclosures to accommodate Metal-Cavity 403 and WNE 300.

In some exemplary embodiments, Metal-Cavity 403 may be realized as a metal-plated plastic structure firmly attached to WNE 300, ensuring that the metallic-coated material of Metal-Cavity 403 forms a perfect electrical connection with GND frame 210, of FIG. 2.

In some exemplary embodiments, an assembly of Metal-Cavity 403 and WNE 300 measures 0.3λ in width (approximately 10 centimeters [cm]), 0.3λ in length (approximately 10 cm), and has a thickness of 0.07λ (approximately 2 cm). Where λ is approximately equal to 30 cm for a 915 MHz operating frequency.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A dual-band shared aperture antenna (2BSA antenna) comprising:
- a patch-antenna disposed on a front side of a printed circuit board (PCB);
- a slot-antenna disposed on a rear side of the PCB; and
- a metal cavity connected to the rear side of the PCB, wherein the metal cavity is electromagnetically coupled with the slot antenna.

2. The 2BSA antenna of claim 1, wherein the front side and the rear side of the PCB are opposite to one another.

3. The 2BSA antenna of claim 1, wherein the patch-antenna is a duplex antenna for frequencies about 2.48 GHz.

4. The 2BSA antenna of claim 3, wherein the patch-antenna is dual linearly polarized antenna adapted to operate either as a horizontal antenna or as a vertical antenna.

5. The 2BSA antenna of claim 4, wherein the patch-antenna further comprises a bandwidth enhancement matching network.

6. The 2BSA antenna of claim 1, wherein the slot-antenna is a broadcasting antenna for frequencies about 915 MHz.

7. The 2BSA antenna of claim 6, wherein the metal cavity geometrically overlaps the rear side of the PCB.

8. The 2BSA antenna of claim 7, wherein the metal cavity facilitates shaping an antenna's radiation pattern direction and providing shielding from disturbances behind the antenna.

9. The 2BSA antenna of claim 8, wherein the slot-antenna is a circular polarization antenna.

10. The 2BSA antenna of claim 9, wherein the slot antenna comprises a meandered slot to increase the slot's length and, consequently, reduce the overall antenna size.

11. The 2BSA antenna of claim 10, wherein the circular polarization is derived by: augmenting the slot antenna with the metal cavity, the meandered slot, and a short-line connection.

12. The 2BSA antenna of claim 11, wherein the short-line is hedged by ground potential, for shielding power input lines entering.

13. The 2BSA antenna of claim 1, further comprises at least one hedge configured to eliminate mutual interference between the patch antenna from the slot antenna.

14. The 2BSA antenna of claim 13, wherein the at least one hedge is comprised of a plurality of closely grounded spaced vias.

* * * * *